3,308,028
PROCESS FOR THE PURIFICATION OF BIOLOGICALLY ACTIVE PREPARATIONS

Jan Willem de Vries, Oss, Netherlands, assignor to Organon Inc., West Orange, N.J., a corporation of New Jersey
No Drawing. Filed June 25, 1964, Ser. No. 378,065
4 Claims. (Cl. 167—75)

This invention relates to a novel process for the purification and decolorization of biological products of animal origin. More particularly, the invention concerns a process for the removal of contaminants from such products by contacting a solution thereof with a synthetic linear polyamide.

In the manufacture on an industrial scale of biologically active preparations from raw materials provided by nature, it is generally impossible to process these raw materials immediately after a sufficient quantity has been collected, for mostly a considerable time elapses due to transport and storage.

Besides the possibility of contamination of the biologically active final product due to the presence of pigments in the fresh raw materials, changes—probably under the influence of light, oxygen in the air and enzymes—in these raw materials may occur during transport and storage that may cause the formation of coloured compounds. By proper storage, e.g. at a low temperature, only partly successful attempts have been made to limit these changes as much as possible.

During the subsequent treatment to obtain the final product further formation of coloured contaminations cannot always be avoided.

Generally these pigments, which spoil the appearance of a preparation, can hardly be removed in a simple manner and with small losses of active substances, as they mostly show great affinity to the biologically active compound to be purified.

Strongly active agents, such as oxidants, can only be used incidentally (see, for instance, Netherlands Patent No. 76,326), while such methods do not qualify at all for proteins or substances part of the molecule of which consists of protein.

The adsorbents commonly used in the industry, such as active carbon and silicates tried for this purpose, have the disadvantage that they are either only slightly selective and besides the pigment also adsorb a large amount of biologically active substance, which can be recovered from the adsorbate with difficulty or not at all, or are only slightly effective.

In an examination into a more effective and specific decolouration method for biologically active preparations, it was observed that in general contaminant pigments show a great affinity to proteins. Efforts were made to remove these disturbing pigments by means of synthetic products structurally suggestive of proteins. It is known from J. Chrom. 5, 408 (1961) that polyamides can be used as adsorbents in the chromatographic separation of alkylated phenols.

A process has been found in accordance with the present invention for the purification and decolourization of a biological product of animal origin comprising contacting a solution of said product with a synthetic linear polyamide. Thus contaminations can be removed in a simple manner without great losses of biologically active substance.

The substance to be purified is dissolved in an aqueous solvent of a suitable pH adjusted with an acid or a base, at which pH said substance dissolves, is reasonably stable and at which adsorption of the contaminations takes place. Preparations to which this purification may be successfully applied are for instance: insulin, heparin, gonadotrophins, adrenocorticotrophins, thyreotropic hormone preparations and enzymes, which are generally obtained from the original natural source materials by extraction with suitable solvents.

By synthetic linear polyamides is meant polymers obtained by the polymerization of diamines with dibasic acids, or by the polymerization of amino carboxylic acids or their lactams. Examples of such diamines include tetramethylene, pentamethylene, hexamethylene, decamethylene, octadecamethylene, and p-xylylene diamines. Examples of dibasic acids include malonic, glutaric, methylglutaric, adipic, suberic, sebacic, azelaic, tetradecanoic, and octadecanoic acids. Examples of amino acids include 6-aminocaproic, 8-aminocaprylic, 17-amino-heptadecanoic acids, and their lactams.

As examples of polyamides to be used are preferably mentioned the polymer obtained from $\epsilon$-caprolactam, known by the name nylon-6, further the polyamide formed from hexamethylene diamine and adipic acid, known as nylon-6,6, and the polymer from hexamethylene diamine and sebacic acid, known as nylon-6,10. In the adsorption the polyamides are used in the form of a powder or a fine granulate, which may be readily filtered from the solution of the biologically active compound. With nylon-6 powder of a particle size of about $4\mu$ and less excellent results have been obtained. It is evident that the polyamide must be insoluble in the medium from which the contaminations are adsorbed.

It has been found that the pH at which the adsorption takes place may be high or low, but that a low pH, from 1.0 up to about 3, is preferred in connection with the fact that a smaller amount of adsorbent is required. It was found for instance that in the decolouration of a brown solution of an impure isoelectric precipitate of cattle insulin, in which the added amount of adsorbent weighed 8 times as much as the available amount of protein, about 80% of the pigment was adsorbed at pH 2.0, whereas at pH 8.0 this percentage amounted to about 50% only. These percentages were determined by measuring the extinction of the solutions before and after adsorption at a wave length of 420 millimicrons by means of a spectrophotometer. Not in all cases is it possible however, to use an arbitrary pH of adsorption, as the stability of the solution to be decoloured must be taken into account and the formation of precipitates of the biologically active substance avoided. In the purification of insulin solutions a pH between 1 and 3 is preferably applied.

The absorbent may be added to the solution of the substance to be purified and the thus obtained suspension adjusted to the desired pH with a base or an acid, whereupon the filter cake is washed with the solvent used, or the adsorption may be performed by means of a column of the adsorbent through which the solution to be purified is filtered till the capacity of the adsorbent has been fully utilized. It is evident that a larger amount of polyamide must be used proportional to the degree of contamination of the solution and that the method according to the invention can be repeated until a sufficiently pure final product has been obtained.

It is not necessary to apply the purification to the final product. This process may also be successfully applied at a suitable stage during the various purification steps.

Thus the invention proved to be of great value to render side-fractions obtained in the manufacture of insulin accessible to further processing, which side-fractions, although still showing considerable biological activity, could not be profitably processed into an acceptable product on account of the accumulation of pigments therein.

Hereafter examples are given of the process according to the invention:

Example I

Two gm. of the sodium salt of heparin obtained from lungs were dissolved in 100 ml. of water. At pH 7 the extinction of this solution, measured at a wave length of 420 millimicrons, amounted to 0.930, layer thickness 1 cm. Sixteen gm. of nylon–6 powder were suspended in water, whereupon the pH of the suspension was adjusted to 4 with hydrochloric acid. After stiring for 30 minutes the suspension was filtered and the moist filter cake added to the solution of the sodium salt of heparin. The pH of the suspension was adjusted to 4.0. After stirring for 30 minutes the suspension was filtered off and the filter cake washed twice by stirring it in 80 ml. of water for 10 minutes, the pH of the water being adjusted to 4.0 with hydrochloric acid. Of the collected filtrates the pH was adjusted to 7 with caustic soda.

The extinction corrected for the dilution now amounted to 0.512 at 420 millimicrons. Hence 44% of the coloured contaminations was removed. The collected filtrates contained 92.6% of the original amount of units of heparin.

Example II

Eight hundred mg. of insulin obtained from cattle pancreas was discovered in 160 ml. of water with a little hydrochloric acid. The pH was adjusted to 2.2 The amount of protein in this solution was determined by the biuret reaction and the value found fixed at 100%. The total amount of brown colour was determined by measurement of the extinction at a wave length of 420 millimicrons and the value found also fixed at 100%.

In hydrochloric acid containing water 6.4 gm. of nylon–6 powder were suspended and stirred for 30 minutes at pH 2.2 The washed adsorbent was collected by filtration and added to the insulin solution, followed by 10 minutes stirring. After filtration the adsorbent was washed another 2 times, each time with 80 ml. of hydrochloric acid of pH 2.2.

The filtrates obtained successively contained 90.2, 9.4 and 2.1% of protein respectively of the quantity originally present, hence a total of 101.7%. Of the total amount of coloured contaminations 73.9% were adsorbed.

Experiments made with other kinds of nylon showed comparable purification effects in which the percentages of adsorbed coloured contaminations were somewhat lower.

Example III

A solution of 1,944 mg. of very dark coloured hog insulin in 385 ml. of hydrochloric acid of pH 2.2 was treated with 16 gm. of nylon–6 powder by the process described in Example II. The filter cake was washed, each time with 200 ml. of hydrochloric acid of pH 2.2 Forty-five percent of the coloured contaminations was removed in this manner, while the collected filtrates still contained 77.9% of protein.

Example IV

In the same manner as described in Example I a decolouration of 42% was reached in the treatment of a gonadotropic preparation from human menopausal urine.

I claim:

1. Method for the decolourization of a biologically active product obtained from the group consisting of animal tissues and animal body fluid comprising contacting an aqueous solution of said product at a pH between about 1 and 8 with particles of a synthetic linear polyamide selected from the group consisting of a polymer obtained by the polymerization of a diamine with a dibasic acid, a polymerized amino carboxylic acid, and a polymerized lactam of an amino carboxylic acid.

2. The method of claim 1 in which the biological product is insulin.

3. The method of claim 1 in which the polyamide is obtained by polymerization of caprolactam.

4. The method of claim 3, in which the treatment is carried out at a pH between 1 and 3.

References Cited by the Examiner

Gasparic et al.: Journal of Chromatography and Chromatographic Data, volume 5, pp. 408–417, 1961.

Kok, Alien Property Custodian Disclosure, Serial No. 373,612, May 11, 1943, 167–75.

ALBERT T. MEYERS, *Primary Examiner.*

LEROY B. RANDALL, *Examiner.*